US010182109B2

(12) United States Patent
Midtun

(10) Patent No.: US 10,182,109 B2
(45) Date of Patent: Jan. 15, 2019

(54) NOTIFICATION SYSTEM AND METHOD FOR SENDING ALERTS TO COMMUNICATION PARTICIPANTS

(71) Applicant: James Midtun, Chandler, AZ (US)

(72) Inventor: James Midtun, Chandler, AZ (US)

(73) Assignee: Mitel Networks Corporation, Ottawa, Ontario (CA)

( * ) Notice: Subject to any disclaimer, the term of this patent is extended or adjusted under 35 U.S.C. 154(b) by 621 days.

(21) Appl. No.: 13/653,650

(22) Filed: Oct. 17, 2012

(65) Prior Publication Data

US 2014/0108499 A1    Apr. 17, 2014

(51) Int. Cl.
  G06F 17/21  (2006.01)
  G06F 17/24  (2006.01)
  H04L 12/18  (2006.01)
  H04L 29/06  (2006.01)
  H04L 29/08  (2006.01)

(52) U.S. Cl.
  CPC ........ H04L 67/104 (2013.01); H04L 12/1827 (2013.01); *G06F 17/218* (2013.01); *G06F 17/242* (2013.01); *H04L 12/1822* (2013.01); *H04L 65/1083* (2013.01); *H04L 65/403* (2013.01)

(58) Field of Classification Search
  CPC . G06Q 10/10; H04L 12/1822; H04L 12/1831; H04L 65/403; H04L 67/104; H04L 65/1083; G06F 17/24; G06F 17/218; G06F 17/242
  USPC ........................................................ 709/203
  See application file for complete search history.

(56) References Cited

U.S. PATENT DOCUMENTS

| 7,455,590 | B2 * | 11/2008 | Hansen ................... G07F 17/32 463/39 |
| 8,295,462 | B2 * | 10/2012 | Miller ............... H04M 3/42153 348/14.08 |
| 8,462,961 | B1 * | 6/2013 | Bywaters ............ H04L 12/1895 381/77 |
| 8,589,167 | B2 * | 11/2013 | Baughman .............. G10L 17/26 704/231 |
| 8,767,935 | B2 * | 7/2014 | Gartner ................. H04M 3/565 379/158 |
| 2003/0093757 | A1 * | 5/2003 | Silverbrook ......... B41J 2/17503 715/230 |
| 2004/0205634 | A1 * | 10/2004 | Linker .................. G06F 17/211 715/273 |
| 2006/0026502 | A1 * | 2/2006 | Dutta ..................... G06Q 10/10 715/230 |
| 2008/0137558 | A1 * | 6/2008 | Baird .................. H04L 12/1831 370/260 |

(Continued)

FOREIGN PATENT DOCUMENTS

WO    WO97/15891 A1    5/1997

*Primary Examiner* — Edward Kim

(57) ABSTRACT

A system and method for automatically alerting participants to or listeners of a communication when a predefined section of the communication is reached are disclosed. In accordance with an exemplary method, prior to a communication, a document corresponding to the communication is marked at predefined locations. During a communication, the document is reviewed for marks, and when a mark is detected, an alert or notification is sent to one or more participants. The participants may then join the communication a point corresponding to the pre-defined section(s).

7 Claims, 8 Drawing Sheets

(56) References Cited

U.S. PATENT DOCUMENTS

| | | | |
|---|---|---|---|
| 2009/0225971 A1* | 9/2009 | Miller | H04M 3/42153 379/202.01 |
| 2011/0038472 A1* | 2/2011 | Gartner | H04L 51/043 379/202.01 |
| 2011/0268263 A1* | 11/2011 | Jones | H04M 3/563 379/202.01 |
| 2011/0270936 A1* | 11/2011 | Guthrie | H04L 12/1827 709/206 |
| 2011/0292161 A1* | 12/2011 | Sharon | H04N 7/142 348/14.07 |

* cited by examiner

NOTIFICATION SYSTEM AND METHOD FOR SENDING ALERTS TO COMMUNICATION PARTICIPANTS

FIELD OF THE INVENTION

The present disclosure generally relates to electronic communication systems and methods. More particularly, the disclosure relates to audio and video communication systems and methods for sending alerts to communication participants based conference or recording content.

BACKGROUND OF THE INVENTION

Electronic video and audio communications (e.g., video or audio conferences or video or audio recordings) typically involve multiple invitees or participants and often include predefined or previously prepared presentations covering one or more topics by one or more speakers. Often times, a participant in an audio or video conference or a listener of an audio or video recording desires to participate in or listen to only a portion of the conference or recording. For example, a participant to a video conference may only be interested in a particular section of a video conference and want to participate only in that section. Or, a listener may only be interested in certain sections or chapters of an audio or video recording.

In the case of video and audio conferencing, if the agenda of the conference call is known ahead of time, and a participant desires to participate in only a portion of the conference, the participant may try to connect to the video conference at the time designated on the agenda corresponding to the desired portion. Similarly, with a recording, if the agenda is known, the listener may fast forward to the time of the recording corresponding to the time on the agenda when the subject matter that the listener wants to hear is scheduled to play.

Unfortunately, conferences and recordings don't always include a schedule or agenda. In these cases, participants may plan to attend the entire conference—even though they know there are sections in which they have no interest, or the participants may plan to attend the beginning of the conference until the subject of interest is presented. Likewise, listeners to a recording may have to listen to the beginning of the recording and continue listening until the subject matter of interest is covered.

In the cases where an agenda by time is known, the conference or recording may not proceed according to the schedule. Thus, if participants join a conference based on the time noted in an agenda, participants in a conference may miss the portion of the conference they intended to participate in or participate in a conference longer than intended when the conference does not go according to the agenda. Similarly, listeners of a recording may have to spend additional time searching for the section of the recording that corresponds to the recording to which they wish to listen, when the recording does not correspond to the agenda.

Therefore, improved systems and methods for notifying conference participants and/or recording listeners when a conference or recording reaches a certain point (e.g., based on content or on a speaker) are desired.

BRIEF DESCRIPTION OF THE DRAWING FIGURES

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements and wherein:

It will be appreciated that elements in the figures are illustrated for simplicity and clarity and have not necessarily been drawn to scale. For example, the dimensions of some of the elements in the figures may be exaggerated relative to other elements to help to improve understanding of illustrated embodiments of the present invention.

DETAILED DESCRIPTION OF EXEMPLARY EMBODIMENTS

The description of exemplary embodiments of the present invention provided below is merely exemplary and is intended for purposes of illustration only; the following description is not intended to limit the scope of the invention disclosed herein. Moreover, recitation of multiple embodiments having stated features is not intended to exclude other embodiments having additional features or other embodiments incorporating different combinations of the stated features.

The disclosure provides a system and method for automatically alerting participants to or listeners of a communication when a particular point of a communication is reached. As set forth in more detail below, the system and method described herein provide listeners or participants with a notification based on content of the communication or an active speaker, rather than on elapsed time. In various embodiments, the system and method described herein include particular machines or devices. The method and system described herein may be implemented using the particular machines or devices, and those hereinafter developed, in any suitable combination, as would be appreciated by one skilled in the art. Further, as is unambiguous from this disclosure, the methods described herein result in various transformations of certain articles.

Figure 1:
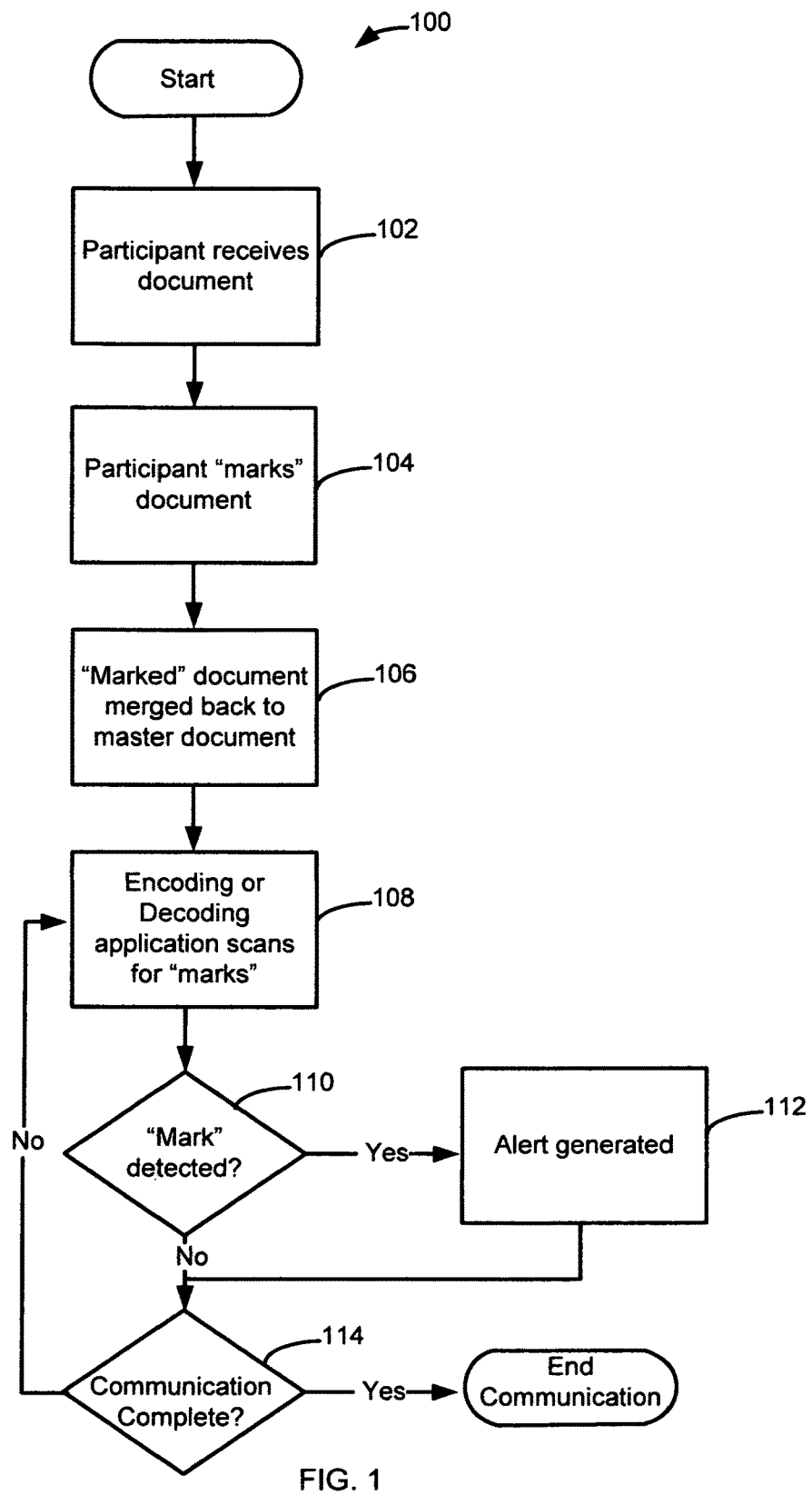
FIG. 1 illustrates a communication method in accordance with various exemplary embodiments of the disclosure.

FIG. 1 illustrates an exemplary method 100 in accordance with various embodiments of the disclosure. Method 100 is used to alert participants to an electronic communication (e.g., a video or audio conference) when a particular section of the communication is reached, so that the participant can join for only the portion(s) of the communication that the participant desires to be part of. As illustrated, method 100 includes the steps of participant receives document corresponding to the communication (step 102), participant marks document (step 104), marked document is merged back to master document (step 106), encoding or decoding applications scans for "marks" (step 108), determination of whether mark detected (step 110), generate alert (step 112), and determination of whether the communication is complete (step 114).

During step 102, a participant to a future communication receives an electronic copy of a document. The document may be in a variety of forms, such as a presentation (e.g., in PowerPoint, Keynote, or Impress format) or a document (e.g., in Word, Pages, or Writer format). The document may be received as part of a meeting request or other communication, such as email, SMS, instant message, or the like.

Once a participant receives a copy of the document, the participant reviews and marks the document during step 104 using a participant application. By way of example, a participant may insert a mark (e.g., image data detectable by video codecs) at a portion of the presentation in which the participant is interested in participating. In accordance with various aspects of these embodiments, the mark includes information that identifies the participant and a method or methods to send an alert to the participant to notify the participant when the marked section of the presentation is reached. The mark may include an image that is not visible during the communication/presentation. As discussed in more detail below, the mark may be detected in either the encoding or decoding stage of a communication.

To facilitate a participant joining the communication at the desired point in the communication, the participant may mark the document earlier than the point at which he or she desires to join, the system could scan ahead for marks and send a notification before the marked portion of the presentation is reached, the presentation/communication could have a pause after each mark, and/or the presenter could be informed of the mark locations within a document and the presenter could allow the participants time to join the conference after each marked point.

A section marked may be based on a variety of factors, such as a topic or section within the presentation, a page or paragraph number within the presentation, or an "active speaker," which may be recognized by the electronic communication system—e.g., a unified communications and collaboration system. A participant may include one or more marks in a document. And, the technique used to alert or notify the participant may vary or be the same for each mark within the document.

After the document is marked by a participant, the document is merged with the original document (step 106). The merged document may be stored on a presenter's device, a participant's device, or another device.

During the communication/presentation, the document is scanned for marks during the encoding and/or decoding of the electronic communication (step 108). Any suitable codec may be used for the encoding and decoding processes. For example, MPEG-4 Part 2 codecs, H.264/MPEG-4 AVC codecs, Microsoft codecs, and other codecs may be used to encode and decode the electronic communication. If a mark is detected, an alert is generated to notify the participant that the marked section of the presentation has been reached (step 112). The alert generated during step 112 may include, for example, an SMS message, an email, an instant message, a phone call, a recorded phone call, a connection to the conference, or any combination thereof. The scanning for marks, and, if applicable alert generation, continues until the communication is complete (step 114).

Figure 2:
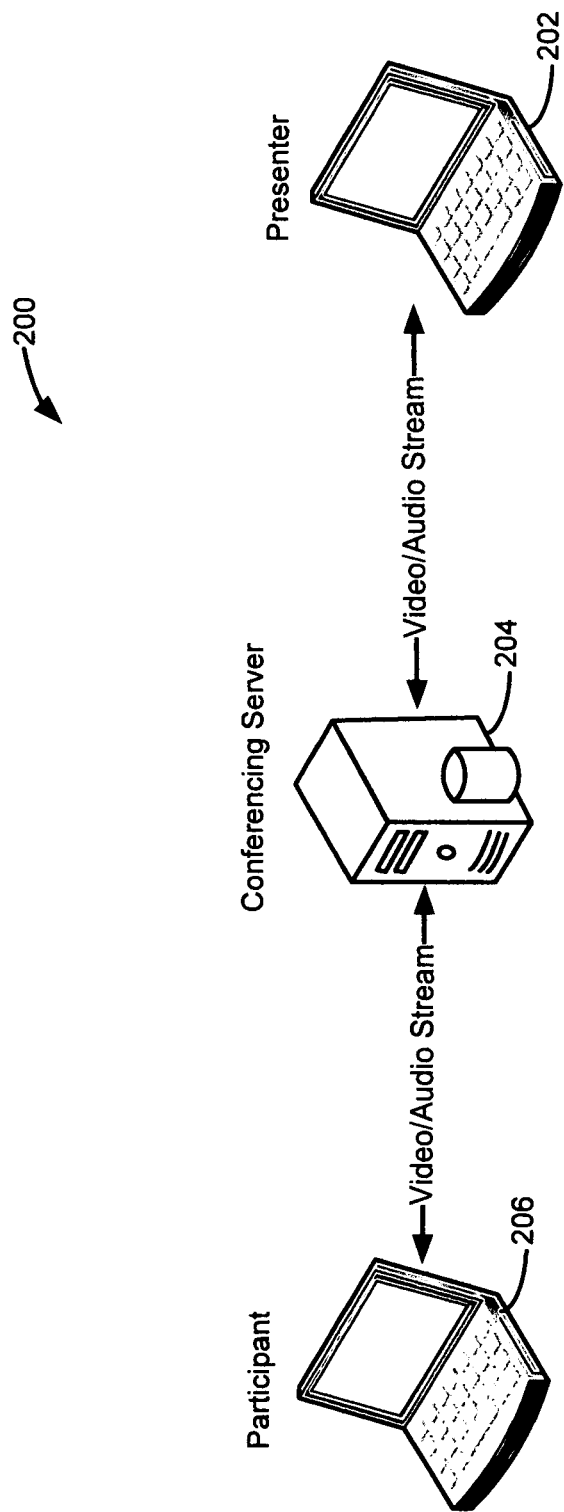
FIG. 2 illustrates a communication system in accordance with additional exemplary embodiments of the disclosure.

FIG. 2 illustrates a system 200, for sending one or more participants alerts corresponding to a marked section of a communication in accordance with method 100. System 200 includes a presenter's device 202, a conference server 204, and a participant's device 206. Exemplary systems may include any suitable number of participants, participant devices, presenters, presenter devices, and servers.

In accordance with exemplary embodiments, presenter's device 202 and participant's device 206 include any device that is capable or encoding and/or decoding electronic communication. For example, devices 202, 206 may include a personal computer, a smart phone, a tablet computer, a server, or other audio or visual communication device. As noted above, participant's device 206 includes an application to allow a participant to receive a document, mark the document in accordance with this disclosure, and optionally to decode the electronic communication and recognize mark(s) during the communication. Similarly, presenter's device 202 includes an application to encode and transmit an electronic communication and may include the ability to identify marks during the encoding process.

Server 204 may be any suitable device capable of facilitating communication or conferencing between presenter's device 202 and the participant's device 206. For example, server 204 may be a private branch exchange (PBX) server, a unified communications server, or the like.

During operation of system 200, if the marks are identified during an encoding process, the alert message may be generated during step 112 at the presenter's or the encoding device and sent to communication server 204 for further transmission to participant's device 206 or another device associated with the participant. Alternatively, if the marks are identified during a decoding process, participant's or the decoding device 206 may either generate an alert to be sent to the participant, or the device may send a "mark identified" message with the relevant participant contact/notification information to another device, such as server 204 or another server, which will then transmit another message to the participant or connect the participant to the communication. For example, server 204 may send a message to or connect a participant on a mobile device.

Figure 3:
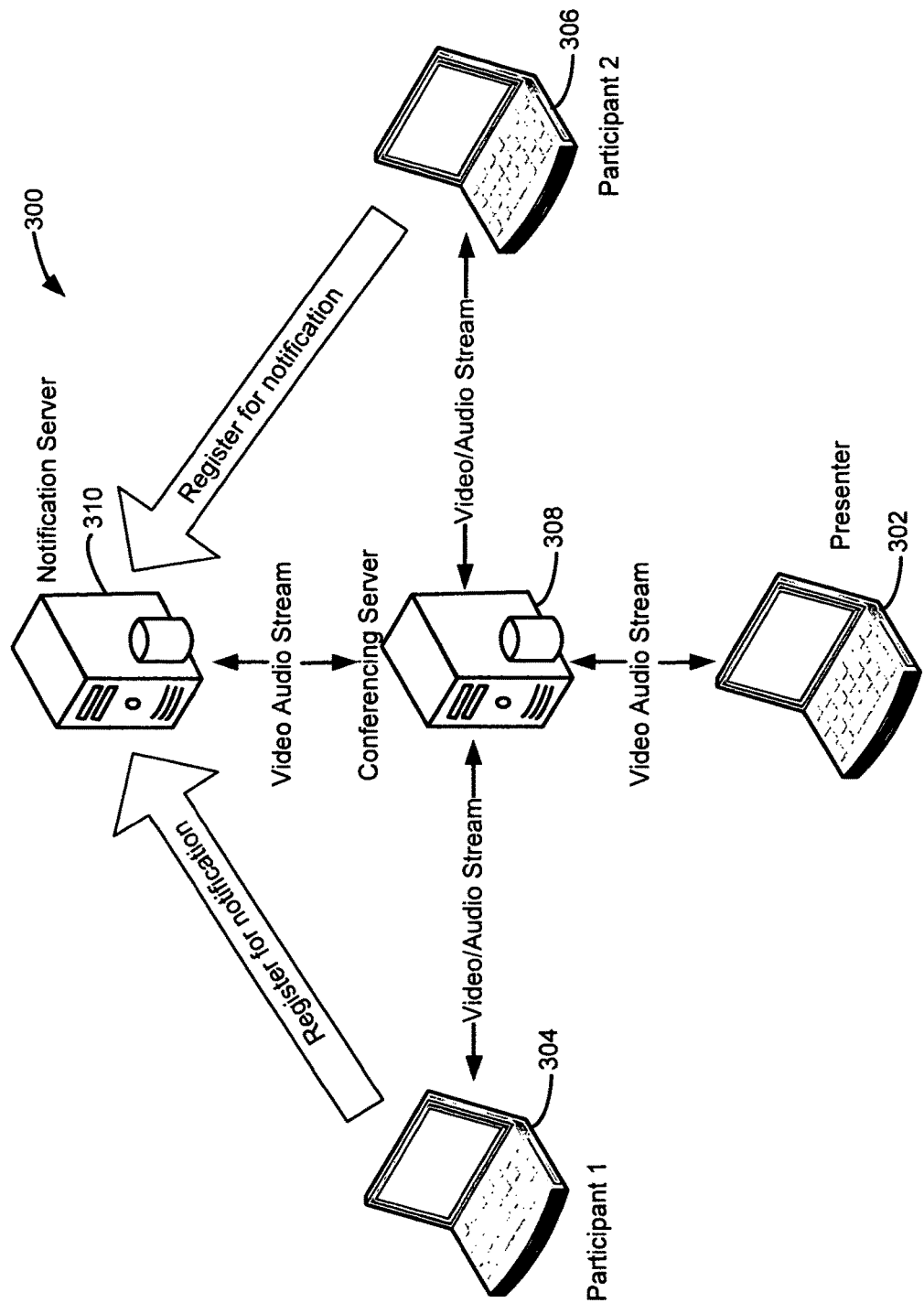
FIGS. 3 and 4 illustrate a communication system, including a notification server, in accordance with additional exemplary embodiments of the disclosure.

FIG. 3 illustrates another system 300, which includes a presenter's device 302, a first participant's device 304, a second participant's device 306, a conference server 308, and a notification server 310. System 300 is similar to system 200, except system 300 includes notification server 310 and is illustrated with an additional participant device 306. Participants' devices 304, 306 may be the same or similar to device 206; presenter's device may be the same or similar to presenter's device 202; and conference server 308 may be the same or similar to sever 204.

Figure 4:
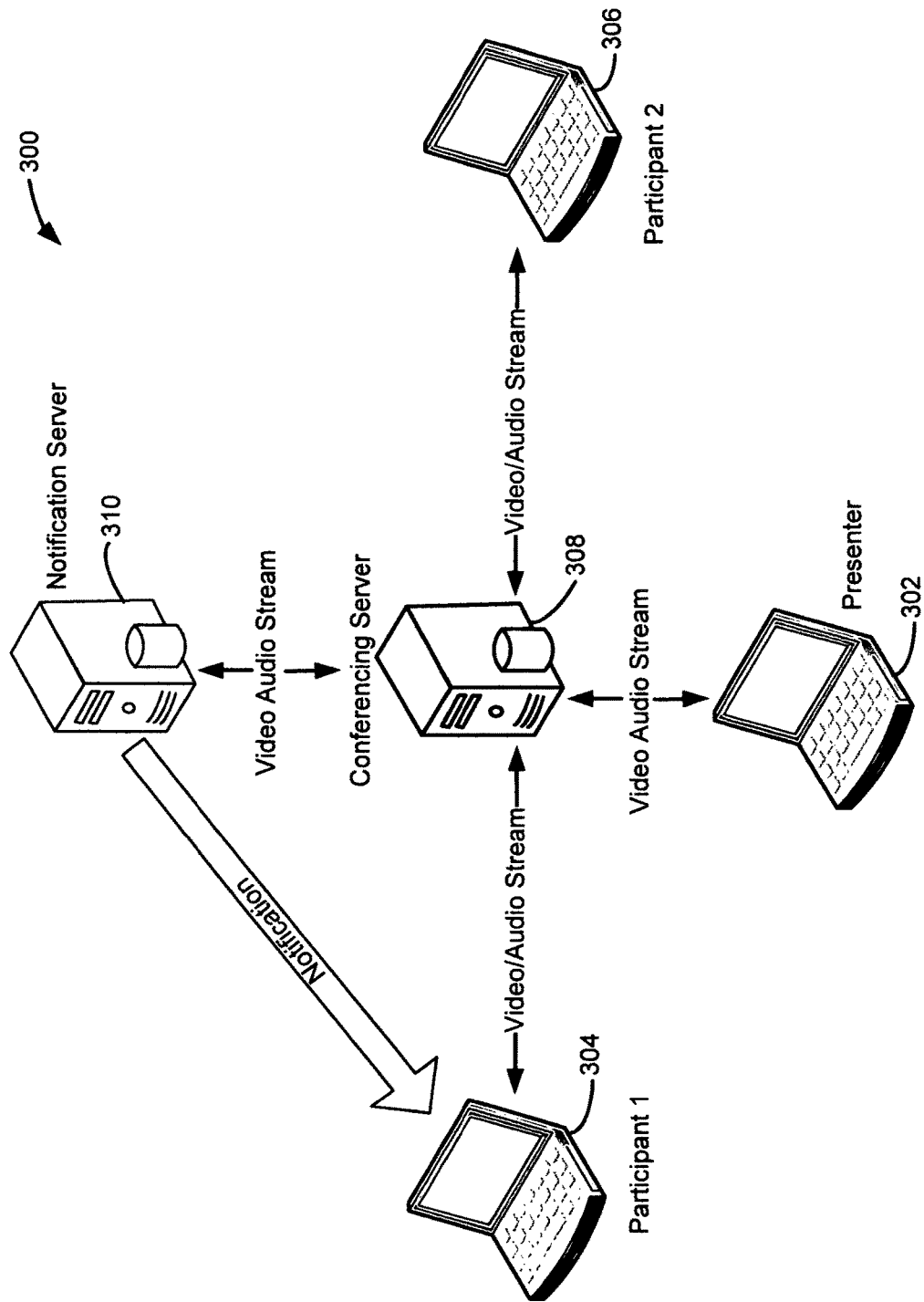

Operation of system 300 is similar to operation of system 200, except, during operation of system 300, each participant wishing to be notified during a communication registers a marked document with notification server 310. The notification server then reviews the marked document during the communication and sends alerts to the respective participant(s) when the marked section of the document is reached. FIG. 4 illustrates the step of notification server 310 sending an alert to participant 304 once a mark is detected.

Figure 5:
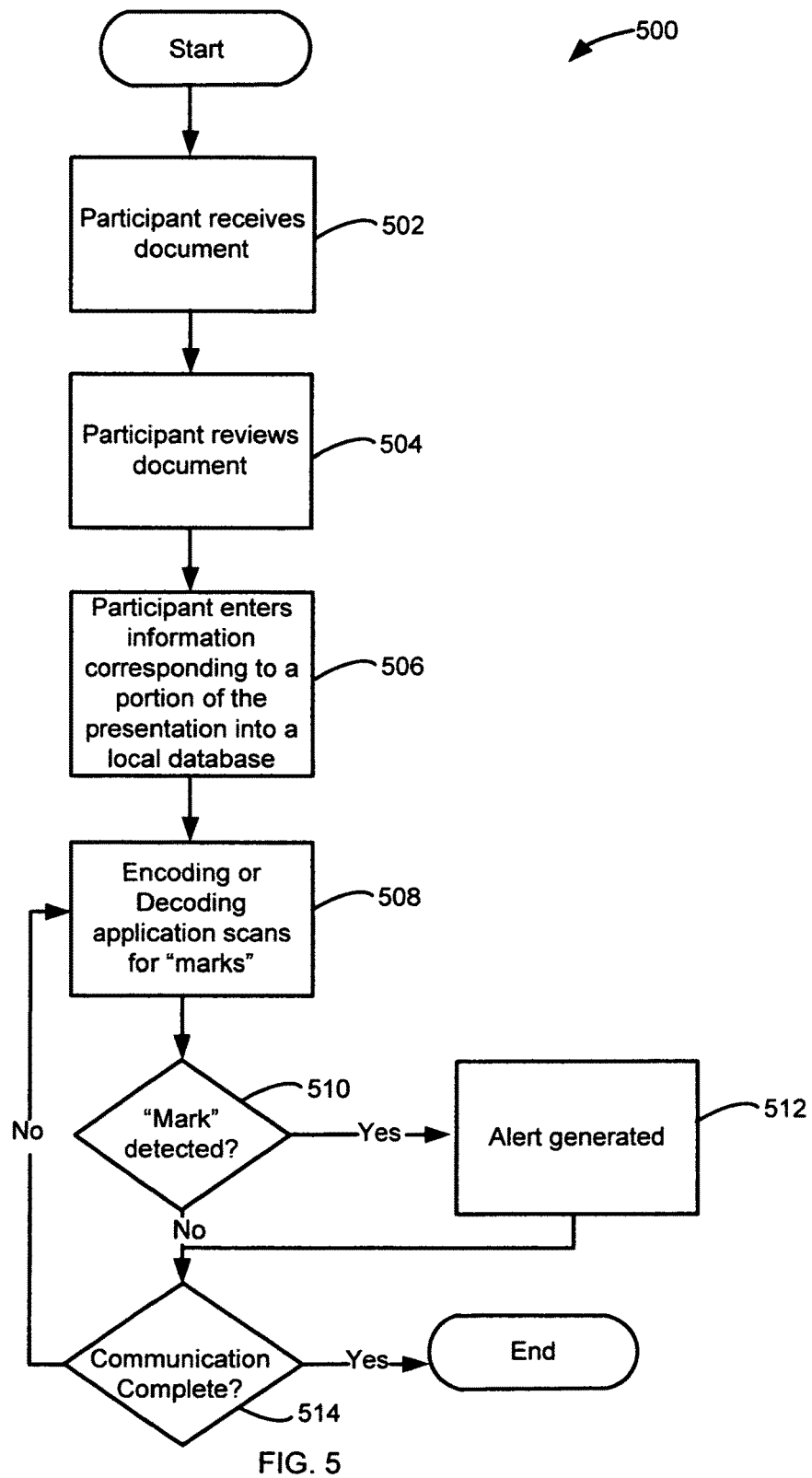
FIG. 5 illustrates a communication method in accordance with various exemplary embodiments of the disclosure.

FIG. 5 illustrates another method 500 in accordance with various exemplary embodiments of the disclosure. Method 500, is similar to method 100, except in method 500, the participant marks the document and creates an entry in a local database, wherein the entry represents a unique section of the document—e.g., a page number, a presenter, a topic, or the like.

Method 500 includes the steps of a participant receiving a document (step 502), participant reviewing the document (step 504), participant enters information corresponding to a portion of the presentation into a local database (step 506), and steps 508-514, which generally correspond to steps 108-114.

During step 502-506, a participant receives a document (e.g., as part of a meeting request, email. SMS, text, or the like) and notes which portion(s) of the corresponding presentation the participant would like to attend. The participant then uses a participant application on a participant device to enter information corresponding to the section(s) the participant desires attend into a local database. For example, a participant may enter a slide number, a page number, an "active speaker," or the like into the local database.

During step 508, the participant's device decodes the communication and accesses local database 608 to determine whether the participant has entered any marks in the local database corresponding to one or more sections of the communication, and if a mark is detected (step 510), an alert would be generated and sent to a participant or a "mark identified" message would be sent to a notification server to generate the alert (step 512).

Figure 6:
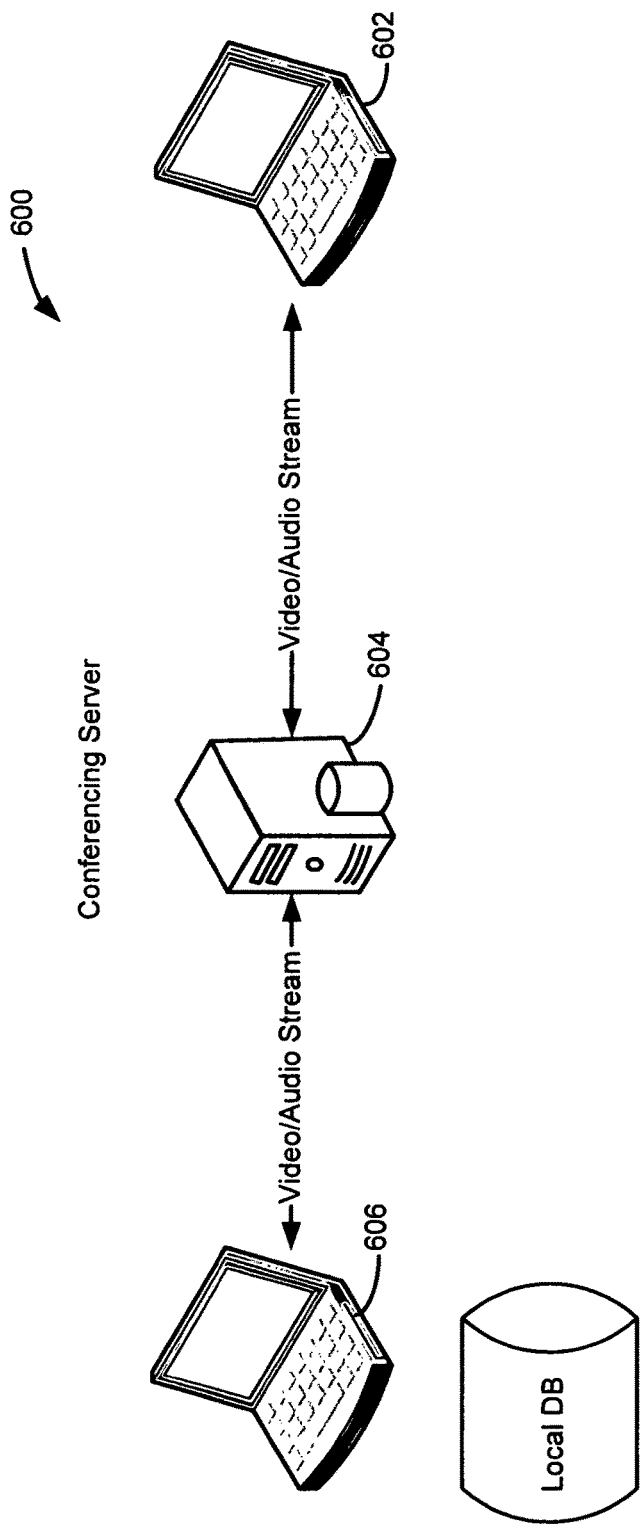
FIG. 6 illustrates a communication system, with a local database, in accordance with exemplary embodiments of the disclosure.

FIG. 6 illustrates a system 600 for notifying a participant when a marked section of a communication is reached in accordance with method 500. System 600 includes a presenter's device 602, which may be the same or similar to device 202, a conference server 604, which may be the same or similar to server 204, a participant's device 606, and a database 608, which may be part of device 606 or coupled to device 606. Although not illustrated, system 600 may additionally include a notification server, which may be the same or similar to server 310, and which receives notification from participant's device 606 when a mark is reached and sends a corresponding notification to the participant.

Participant's device 606 includes an application to allow a participant to receive and mark a document—e.g., with reference images, page numbers, slide numbers, "active speaker," or the like. Database 608 stores the information corresponding to the document (e.g., the image, page number, slide number, or the like to scan) and the action to take (e.g., email, SMS, instant message, phone call, recorded voice call, or join conference) upon detection of a mark during the communication.

Figure 7:
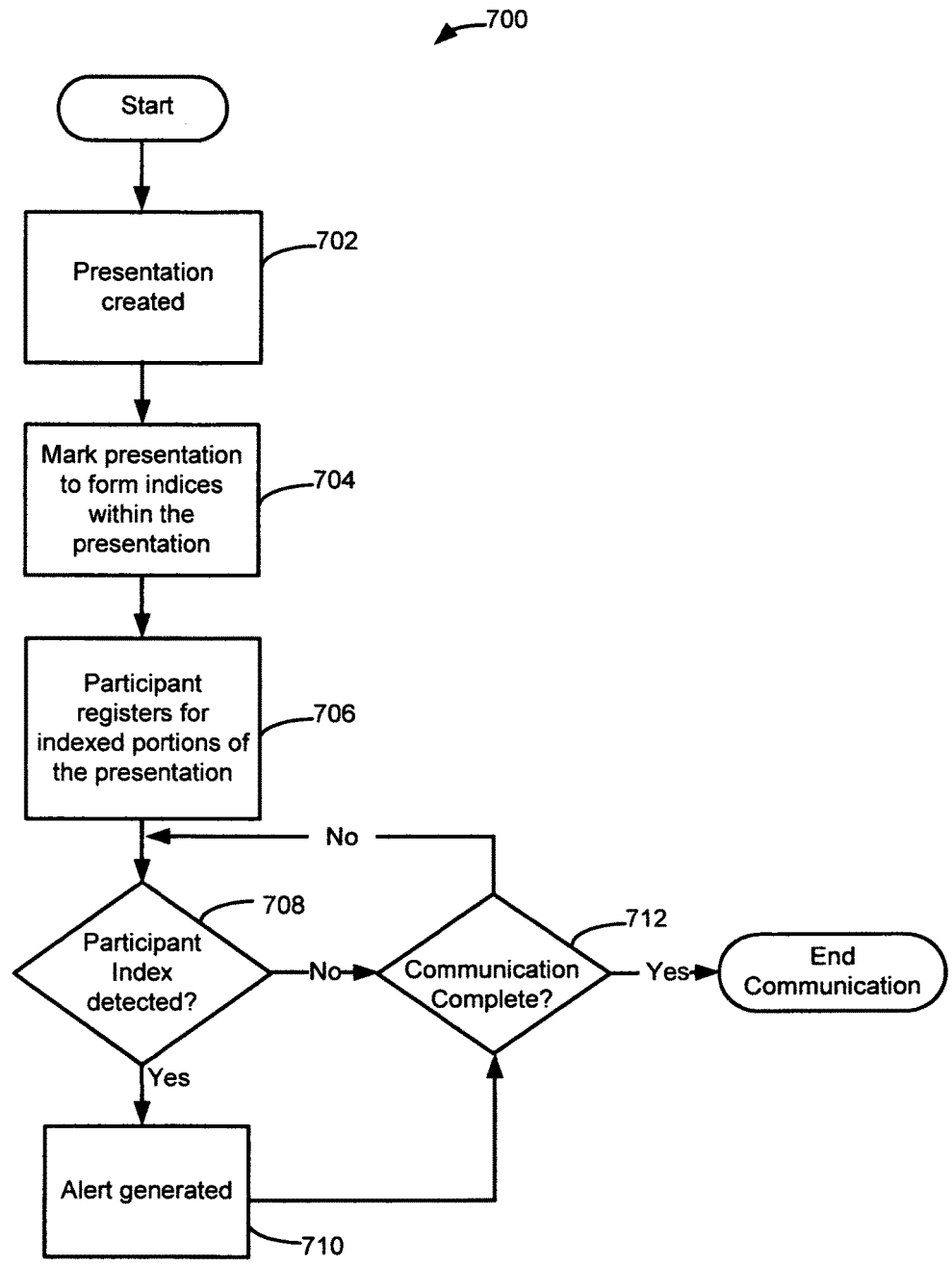
FIG. 7 illustrates a communication method in accordance with various exemplary embodiments of the disclosure.

FIG. 7 illustrates a method 700 of notifying a participant when a section of a communication or presentation is reached in accordance with additional exemplary embodiments of the disclosure. Method 700 includes the steps of creating a presentation (step 702), marking the presentation to form indicies within the presentation (step 704), participant registration (step 706), determining whether an index is detected (step 708), if an index is detected, generating an alert or notification (step 710), and determining whether the presentation is complete (step 712).

During step 702 a presentation is created. The presentation is then indexed during step 704 to create chapters or sections within the document. The indexing may be done by any user, such as a participant, the presenter, or an administrator, using an application on a device (e.g., a presenter's device, a participant's device, or an administrator's device). A participant reviews the presentation, during step 706, in advance of the communication and registers for sections or chapters of the presentation, using an application on a device and based on the marks established during step 704. The marks and a method of notification may be saved on a server. During the presentation, if and when a mark is reached during the presentation, step 708, an alert or notification is sent from the server to the participants to join the presentation, step 710—e.g., using any of the techniques described above. The trigger for the alert may be manual (driven by the presenter—e.g., by selecting a button in the presentation—or may be automatic based on speech recognition or based on the presenter (e.g., "active speaker").

Figure 8:
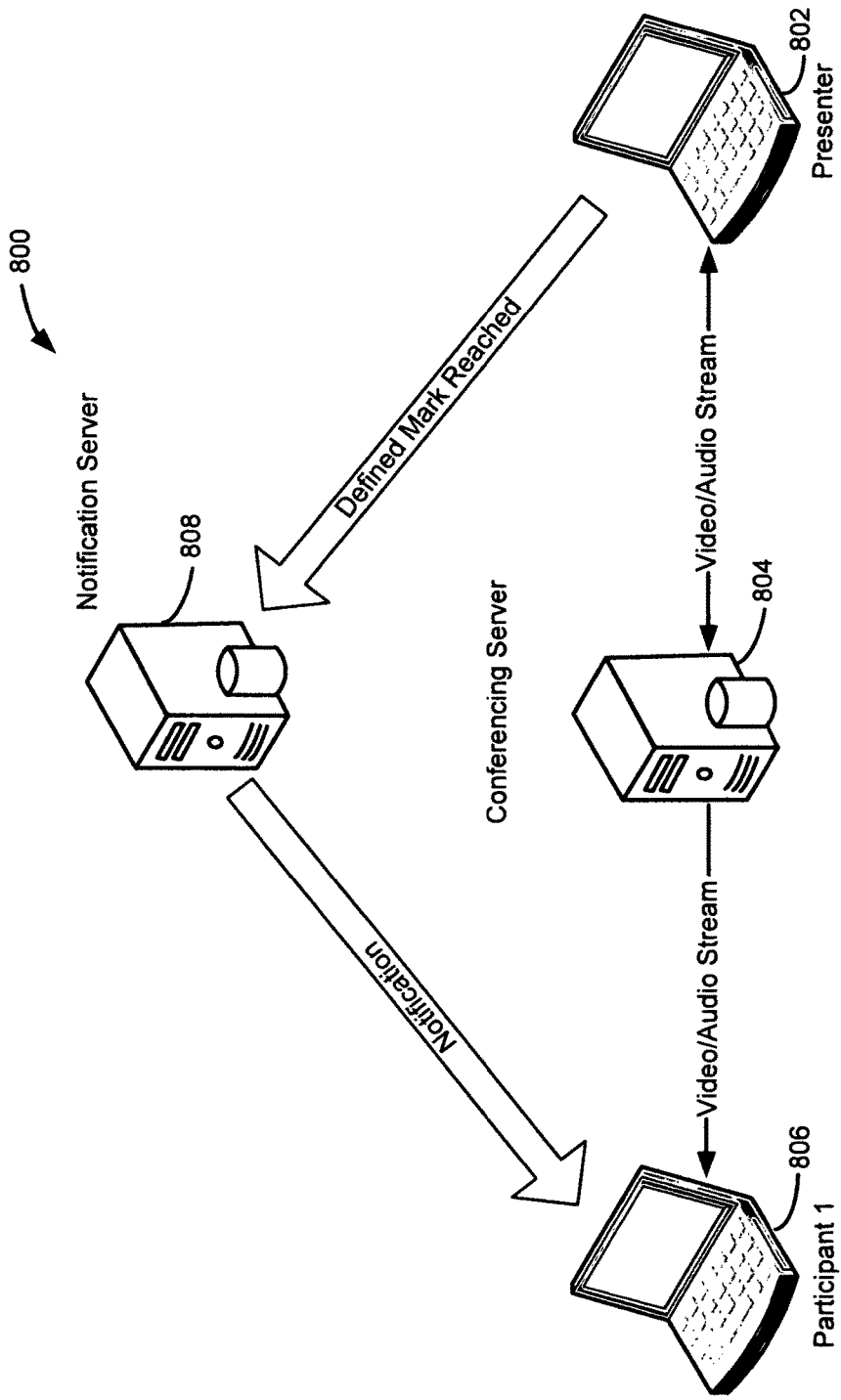
FIG. 8 illustrates another communication system in accordance with various exemplary embodiments of the disclosure.

FIG. 8 illustrates a system 800 for implementing method 700 in accordance with exemplary embodiments of the disclosure. System 800 includes a presenter's device 802, a conferencing server 804, a participant's device 806, and a notification server 808. Presenter's device 802, server 804, and participant's device 806 may include any devices described above in connection with device 202; server 204, and device 206. Participant's device 806 includes an application to allow a participant to register for one or more indexed sections of a presentation. Information corresponding to the indexed section(s) may be stored on a server, such as server 804 or 808. In this case, the server sends an alert to the participant when the marked section(s) of the document are reached.

As noted above, one of the marking options in accordance with various exemplary embodiments is an "active speaker" option. In this case, a participant may indicate that he or she is interested in participating in or listening to a communication when a particular speaker is presenting. In accordance with exemplary aspects, a conferencing system—e.g., part of a server, such as server 804 or 808, includes the ability to identify an active speaker and the system sends an alert to participant(s) that have marked the portion of the presentation corresponding to that speaker. The active speaker mark/notification option can be combined with other marks as described herein or in combination with elapsed time (in which case an alert would be issued after a predefined amount of time elapses after an active speaker is recognized by the system. This could be used to avoid sitting through introduction of speakers or the like.

An alert based on "active speaker" recognition could be issued in several ways. For example, a participant could mark the desired speakers and alerts can be generated through a central server—e.g., a communication or notification server as described above. The central server may generate an alert or notify a local system to generate the alert when the active speaker trigger has fired. In another embodiment, the central conferencing server communicates active speaker information to a participant's device, which can then generate the alert based on the locally saved trigger information.

In accordance with yet further embodiments, a system and method may be used to automatically generate sections or chapters of a recorded communication. In this case, similar to how a participant or presenter registers marks for specific triggers against a document or agenda using the above-described method using, e.g., images, slide numbers, page number, or active speaker, a user or participant can identify "break points" within a communication. The communication recording can then be processed and broken into separate recordings or chapters based on the break points. Prior to this invention, a user would have to view or listen to the actual recording and use tools to section the recording. This "sectioning" can also be done by administrators and then allow certain sections to be automatically distributed to registered participant lists. For instance, a "sales" section of a conference call can be automatically distributed to the sales recipient list and a "marketing" section can be sent to the marketing department.

Similarly, for "live" electronic communications, the system may be configured to automatically send alerts or notifications to predefined participants corresponding to predefined marked sections within a marked document.

The present invention has been described above with reference to a number of exemplary embodiments and examples. It should be appreciated that the particular embodiments shown and described herein are illustrative of the invention and its best mode and are not intended to limit in any way the scope of the invention as set forth in the claims. It will be recognized that changes and modifications may be made to the exemplary embodiments without departing from the scope of the present invention. These and other changes or modifications are intended to be included within the scope of the present invention, as expressed in the following claims.

I claim:

1. A method for automatically alerting a participant of an electronic communication during a video conference or an audio conference, the method comprising the steps of:
    before the video conference or audio conference, receiving, on a participant's device, a document corresponding to the communication;
    before the video conference or audio conference, marking the document using an application on the participant's device to form a marked document, marking includes marking an active speaker, having one or more marks, each of the one or more marks including information that identifies the participant and a method to send an alert to the participant to notify the participant when the active speaker is identified, wherein the information is stored on a local database of the participant's device;
    before the video conference or audio conference, storing information corresponding to the marked document;
    before the video conference or audio conference, locally storing, on the participant's device, a trigger for the alert;
    during the video conference or audio conference, a decoding application on the participant's device scanning the marked document for marks;
    when the mark is detected and the active speaker is identified to be speaking, the participant's device automatically generating an alert to notify that the active speaker is speaking based on the locally saved trigger information; and
    the participant's device sending said alert to a mobile device of the participant to facilitate the participant joining the video conference or audio conference when the active speaker is speaking.

2. The method for automatically alerting a participant of an electronic communication of claim 1, further comprising the step of registering the marked document with a notification server.

3. The method for automatically alerting a participant of an electronic communication of claim 1, wherein the step of sending an alert comprises sending one or more of an SMS message, an email, an instant message, a phone call, a recorded phone call, and a connection to the conference.

4. The method for automatically alerting a participant of an electronic communication of claim 1, wherein the step of storing includes storing information corresponding to one or more of: topic, section, page number, paragraph number, or active speaker.

5. A system for automatically alerting a participant of an electronic communication during a video conference or an audio conference, the system comprising:
    a participant's device configured to receive, before the video conference or audio conference, a document corresponding to the video conference or audio conference;
    an application on the participant's device configured to mark, before the video conference or audio conference, the document to form a marked document, marking includes marking an active speaker, having one or more marks, each of the one or more marks including information that identifies the participant,
    a database for storing, before the video conference or audio conference, information corresponding to the marked document and local storing, on the participant's device, a trigger for an alert;
    a decoding application on the participant's device configured to:
        scan the marked document for marks during the video conference or audio conference;
        when the mark is detected and the active speaker is identified to be speaking, generate automatically an alert to notify the participant that the active speaker is speaking based on the locally saved trigger information; and
        send said alert to a mobile device of the participant to facilitate the participant joining the video conference or audio conference when the active speaker is speaking.

6. The system for sending one or more participants alerts corresponding to a marked section of a communication of claim 5, further comprising a notification server coupled to the participant's device, wherein the notification server reviews the marked document and sends a notification to a participant based upon information corresponding to a mark within the document.

7. The system for sending one or more participants alerts corresponding to a marked section of a communication of claim 5, wherein the marking corresponds to one or more of a topic, a section, a page number, a paragraph number, or active speaker.

* * * * *